United States Patent
Ruiz et al.

(10) Patent No.: US 8,517,464 B2
(45) Date of Patent: Aug. 27, 2013

(54) TRAY TABLE STOP ASSEMBLY

(75) Inventors: Macario Ruiz, Denton, TX (US);
Robert W. Trimble, Gainesville, TX (US); Girish Malligere, Lake Dallas, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 220 days.

(21) Appl. No.: 13/093,216

(22) Filed: Apr. 25, 2011

(65) Prior Publication Data

US 2011/0277672 A1 Nov. 17, 2011

Related U.S. Application Data

(60) Provisional application No. 61/327,210, filed on Apr. 23, 2010.

(51) Int. Cl.
*A47B 83/02* (2006.01)

(52) U.S. Cl.
USPC .......................................... 297/146; 297/163

(58) Field of Classification Search
USPC ................................................. 297/146, 163
See application file for complete search history.

(56) References Cited

U.S. PATENT DOCUMENTS

| | | | | |
|---|---|---|---|---|
| 4,431,231 A | * | 2/1984 | Elazari et al. | 297/163 |
| 4,511,178 A | * | 4/1985 | Brennan | 297/146 |
| 6,550,861 B1 | * | 4/2003 | Williamson | 297/163 X |
| 8,052,208 B2 | * | 11/2011 | Kim et al. | 297/146 |
| 2003/0094837 A1 | * | 5/2003 | Williamson et al. | 297/163 |

FOREIGN PATENT DOCUMENTS

| | | |
|---|---|---|
| FR | 2775639 FR | 9/1999 |
| WO | WO2011041343 | 4/2011 |

OTHER PUBLICATIONS

International Search Report and Written Opinion dated Aug. 24, 2011 in Application No. PCT/US2011/033743.
International Preliminary Report on Patentability dated Nov. 1, 2012 in Application No. PCT/US2011/033743.

* cited by examiner

*Primary Examiner* — Rodney B White
(74) *Attorney, Agent, or Firm* — Dean W. Russell; Tiffany L. Williams; Kilpatrick Townsend & Stockton LLP

(57) ABSTRACT

Described are tray table stop assemblies comprising a housing comprising at least one deployment track, a force-receiving mechanism comprising at least one protuberance, wherein the at least one protuberance is slidingly coupled to the at least one deployment track, and a biasing mechanism positioned between the force-receiving mechanism and the housing. In some embodiments, the tray table stop assembly is coupled to a passenger seat assembly adjacent a tray table assembly having at least one arm. In these versions, the arm of the tray table assembly is positioned to apply pressure to the force-receiving mechanism when the tray table assembly travels between a stowed position and a deployed position. When the tray table assembly moves forward beyond the stowed position, the force-receiving mechanism is positioned within the travel path of the arm.

15 Claims, 6 Drawing Sheets

TRAY TABLE STOP ASSEMBLY

CROSS REFERENCE TO RELATED APPLICATION

This application is related to and claims priority benefits from U.S. Provisional Application Ser. No. 61/327,210, filed on Apr. 23, 2010, entitled FOOD TABLE STOP. The '210 application is hereby incorporated herein in its entirety by this reference.

FIELD OF THE INVENTION

The invention relates to tray tables of passenger seats or the like.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort and enjoyment, many passenger seat backs are utilized to install amenities, such as a tray table, for the passenger's use during the trip.

In some instances, a tray table may be mounted adjacent a surface of the passenger seat back. The tray table may be deployed by the passenger to provide a relatively flat surface for eating, working, recreation, or other uses. Conventionally, these tray tables are mounted to an exterior surface of the seat back. These tray tables generally rotate first away from the seat back via tray table arms, which are pivoted at a point on the passenger seat below the tray table, and second downward from the seat back, by pivoting from the tray table arms, for use by the passenger. When not in use by the passenger, these tray tables may be stowed against the seat back by general latching techniques.

In certain situations, however, these tray tables may inadvertently deploy from the stowed position without passenger initiation. Typically, such inadvertent deployment occurs during crashes, but may also occur during other types of events that may apply a force to the latch holding the tray table in the stowed position. Inadvertent deployment of a tray table during or immediately following a crash or at other times may restrict an exit pathway from the vehicle and/or hinder movement of passengers.

Thus, it may be desirable to reduce the opportunity for the tray table or other radially moving apparatuses to become un-stowed in crashes and similar circumstances. It may also be desirable to limit the space occupied by the tray table or other radially moving apparatuses if these objects become un-stowed in crashes and similar circumstances.

SUMMARY

Embodiments of the invention include a tray table stop assembly comprising a housing comprising at least one deployment track, a force-receiving mechanism comprising at least one protuberance, wherein the at least one protuberance is slidingly coupled to the at least one deployment track, and a biasing mechanism positioned between the force-receiving mechanism and the housing. The deployment track need not extend along the entire length of the housing. In some embodiments, the force-receiving mechanism may include a biasing mechanism receptacle that is configured to receive a portion of the biasing mechanism. The force-receiving mechanism may also include a cover.

The housing may include at least one loading track that is configured to receive the at least one protuberance when the force-receiving mechanism is inserted within the housing. The housing may also include at least one rotation track that is coupled to the deployment track and the at least one loading track, wherein the deployment track is configured to receive the at least one protuberance when the force-receiving mechanism is inserted within the housing and rotated. In other embodiments, the housing may be formed of a deformable material.

In some embodiments, the tray table stop assembly is coupled to a passenger seat assembly adjacent a tray table assembly having at least one arm. In these embodiments, the arm of the tray table assembly is positioned to apply pressure to the force-receiving mechanism when the tray table assembly travels between a stowed position and a deployed position. When the tray table assembly moves forward beyond the stowed position, the force-receiving mechanism is positioned within the travel path of the arm.

The tray table stop assembly may be assembled by inserting the force-receiving mechanism within the housing and coupling the at least one protuberance to the at least one deployment track. The method may also include inserting the at least one protuberance into the at least one loading track. The method may further include rotating the force-receiving mechanism within the housing, so that the at least one protuberance travels along the at least one rotation track when the force-receiving mechanism is rotated.

The tray table stop assembly may be operated by positioning the tray table stop assembly adjacent a tray table assembly and positioning an arm of the tray table assembly adjacent the force-receiving mechanism when the force-receiving mechanism is inserted. The method of operation may further include moving the arm forward beyond a stowed position; and deploying the force-receiving mechanism into the travel path of the arm.

DETAILED DESCRIPTION

Figure 1:
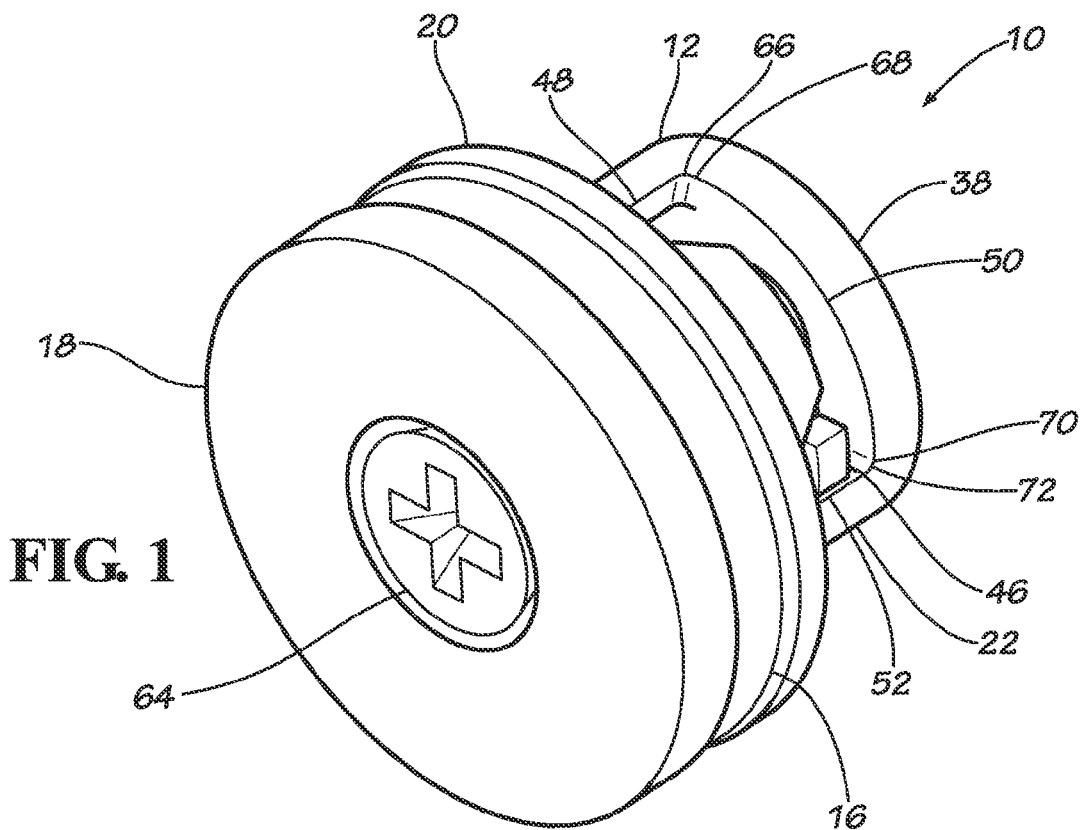
FIG. 1 is a perspective view of a tray table stop assembly according to one embodiment of the present invention.

The described embodiments of the invention provide tray table stop assemblies for use with a tray table arm of a passenger seat. While the tray table stop assemblies are discussed for use with tray tables attached to passenger seats, they are by no means so limited. Rather, embodiments of the tray table stop assemblies may be used for other radially moving apparatuses in passenger seats or other seats of any type or otherwise as desired.

FIGS. 1-7 illustrate embodiments of a tray table stop assembly 10. In these embodiments, the tray table stop assembly 10 comprises a housing 12, a biasing mechanism 14 such as spring, and a force-receiving mechanism 16 such as a button. In some embodiments, the tray table stop assembly 10 may further comprise a cover 18.

In some embodiments, the housing 12 comprises a housing face plate 20 and a housing body 22. The housing body 22 may have any suitable cross-sectional shape including but not limited to cylindrical, rectilinear, trapezoidal, or other similar polygonal shape. In other embodiments, it may be suitable for the length and width of the cross-sectional shape of the housing body 22 to have differing dimensions. In these embodiments, the housing face plate 20 may also have any suitable shape including but not limited to a circle, oval, rectangle, or other similar shape. The housing face plate 20 and the housing body 22 may be formed of materials including but not limited to aluminum, stainless steel, other metallic materials, composite materials, flexible plastics, or other similar materials.

In some embodiments, such as the embodiment illustrated in FIGS. 1-7, the housing face plate 20 and the housing body 22 may be integrally formed. The outer cross-sectional surface of the housing face plate 20 may align with portions of the outer cross-sectional surface of the housing body 22 or may extend past some or all of the outer cross-sectional surface of the housing body 22. Alternatively, the thickness of the housing body 22 may form the housing face plate 20, so that the housing 12 has a uniform cross-sectional shape along its length.

In these embodiments, the housing body 22 of the housing 12 is configured to couple to a stationary point 24 on a passenger seat assembly 26. In the embodiments shown in FIGS. 1-7, the stationary point 24 is a receptacle positioned within an arm rest 28 adjacent a seat back 30 of the passenger seat assembly 26. However, one of ordinary skill in the relevant art will understand that the stationary point 24 may have any suitable configuration and may be positioned in any suitable location that allows the stop mechanism 10 to interact with a tray table assembly 32. Likewise, the housing body 22 may be coupled to the stationary point 24 via any suitable mechanical or chemical fasteners.

The housing 12 may also include a housing recess 34. In some embodiments, such as the embodiments shown in FIGS. 1-7, the housing recess 34 forms an aperture 36 that extends through the housing face plate 20 and at least a portion of the housing body 22 so that the housing recess 34 is partially enclosed by a base 38 positioned at an end of the housing body 22. In other embodiments, the housing recess 34 may extend through the housing body 22 to create the aperture 36 along the entire length of the housing 12 and through the base 38. The housing recess 34 may have any suitable shape including but not limited to cylindrical, rectilinear, trapezoidal, or other similar polygon shape.

In some embodiments, the force-receiving mechanism 16 comprises a force-receiving mechanism body 40 and a force-receiving mechanism face plate 42. In these embodiments, such as the embodiment illustrated in FIGS. 1-7, the force-receiving mechanism face plate 42 and force-receiving mechanism body 40 may be integrally formed. In other embodiments, the force-receiving mechanism face plate 42 may be coupled to the force-receiving mechanism body 40. The outer cross-sectional surface of the force-receiving mechanism face plate 42 may align with portions of the outer cross-sectional surface of the force-receiving mechanism body 40 or may extend past some or all of the outer cross-sectional surface of the force-receiving mechanism body 40. The force-receiving mechanism face plate 42 and force-receiving mechanism body 40 may be formed of materials including but not limited to aluminum, stainless steel, other metallic materials, composite materials, or other similar materials.

In these embodiments, such as the embodiment illustrated in FIGS. 1-7, the force-receiving mechanism body 40 may have any suitable cross-sectional shape that allows the force-receiving mechanism body 40 to be inserted within the housing recess 34 including but not limited to cylindrical, rectilinear, trapezoidal, or other similar polygon shape. In some embodiments, the outer cross-sectional shape of the force-receiving mechanism body 40 corresponds to the overall cross-sectional shape of the housing recess 34. For example, in the embodiment shown in FIGS. 1-7, the force-receiving mechanism body 40 has a generally circular cross-sectional shape, and the housing recess 34 has a complimentary generally circular cross-sectional shape that is configured to allow the force-receiving mechanism 16 to be inserted within the housing recess 34. In other embodiments, the force-receiving mechanism body 40 and the housing recess 34 may have different cross-sectional shapes, so long as the cross-sectional shape of the force-receiving mechanism body 40 is capable of being inserted within the housing recess 34.

In some embodiments, such as the embodiment illustrated in FIGS. 1-7, a lower end 44 of the force-receiving mechanism body 40 includes at least one protuberance 46 that is configured to slidingly engage with the housing body 22 after the force-receiving mechanism body 40 has been inserted into the housing recess 34. In this embodiment, the housing recess 34 includes at least one loading track 48 that is positioned along the cross-sectional shape of the housing recess 34 in a position that corresponds to the position of the protuberance 46. The protuberance 46 may be formed of materials including but not limited to aluminum, stainless steel, other metallic materials, composite materials, or other similar materials. In some embodiments, such as the embodiment illustrated in FIGS. 1-2, the protuberance 46 and the force-receiving mechanism body 40 may be integrally formed. In other embodiments, the protuberance 46 may be coupled to the force-receiving mechanism body 40. The location of the protuberance 46 on the force-receiving mechanism body 40 may vary throughout embodiments.

Thus, in this embodiment, to insert the force-receiving mechanism body 40 within the housing recess 34, the protuberance 46 is first aligned with the loading track 48. The loading track 48 is configured to extend along a portion of the length of the housing recess 34, where the length of the loading track 48 generally corresponds to the length of the force-receiving mechanism body 40.

An end 66 of each loading track 48 is coupled to a first end 68 of at least one rotation track 50. The rotation track 50 is positioned at a depth of the housing recess 34 that corresponds to an inserted position of the force-receiving mechanism 16 (where the force-receiving mechanism 16 has been inserted within the housing 12 until the protuberance 46 reaches the end 66 of the loading track 48).

A second end 70 of each rotation track 50 is coupled to a first end 72 of at least one deployment track 52. Thus, the rotation track 50 is configured to allow the force-receiving mechanism 16 to rotate from the inserted position to a loaded position (where the force-receiving mechanism 16 is inserted within the housing 12 and the protuberance 46 is positioned at the first end 72 of the deployment track 48). The length of the rotation track 50 may be any suitable length that allows the force-receiving mechanism 16 to rotate until the force-receiving mechanism 16 reaches the loaded position.

The deployment track 52 extends approximately parallel to the loading track 48, but terminates at a second end 74 prior to reaching the outer surface of the housing recess 34. Thus, when the force-receiving mechanism 16 is in the loaded position, the protuberance 46 may travel along the deployment track 52 until the force-receiving mechanism 16 reaches a deployed position (where the force-receiving mechanism 16 is partially retracted from the housing 12 and the protuberance 46 is positioned at the second end 74 of the deployment track 52).

In this embodiment, a press-and-twist method is employed to couple the force-receiving mechanism 16 to the housing 12. The coupling is initiated by passing the protuberance 46 into the loading track 48 when a force is applied to the force-receiving mechanism face plate 42 (the "press"). When the protuberance 46 reaches the end 66 of the loading track 48 and the force-receiving mechanism 16 is in the inserted position, the force-receiving mechanism 16 is rotated until the protuberance 46 reaches the second end 70 of the rotation track 50, which stops the force-receiving mechanism 16 from rotating further in that direction (the "twist"). At this point, the protuberance 46 is positioned at the first end 72 of the deployment track 52. When the external force is removed from the force-receiving mechanism face plate 42, the biasing mechanism 14 forces the protuberance 46 to travel along the deployment track 52 until the protuberance 46 reaches the second end 74 of the deployment track 52 and the force-receiving mechanism 16 is in the deployed position.

In other embodiments, the loading track 48 is not required to couple the force-receiving mechanism 16 to the housing 12. For example, in one embodiment, the housing recess 34 may be shaped such that it has at least a first length and a second length, where the first length is longer than the combined cross-sectional length of the protuberances 46 and the force-receiving mechanism body 40 so that the force-receiving mechanism body 40 can be inserted into the housing recess 34 when aligned with the first length. Once the force-receiving mechanism 16 reaches the inserted position, the force-receiving mechanism 16 is rotated until the protuberance 46 enters the rotation track 50, which is joined at the second end 70 to the first end 72 of the deployment track 52. The deployment track 52 terminates at the second end 74 prior to reaching the outer surface of the housing recess 34.

In other embodiments, the material used to form the housing 12 may allow for some deformation while the force-receiving mechanism 16 is being inserted. Such materials may include but is not limited to general plastics, nylon, and other deformable materials. The use of deformable materials would obviate the need for the loading tracks 48, as the housing 12 may simply expand slightly to allow the protuberances 46 to pass through the housing recess 34 until the protuberances 46 reach the deployment track 52. In this embodiment, the rotation track 50 may also not be needed, as it may be sufficient to simply apply external pressure to the force-receiving mechanism 16 to maintain the force-receiving mechanism 16 in the loaded position during installation.

In some embodiments, the force-receiving mechanism 16 may include more than one protuberance 46, so the housing 12 would include additional sets of associated tracks that correspond to the number of protuberances 46. For example, in the embodiments shown in FIGS. 1-7, the tray table stop assembly 10 includes two protuberances 46 and two sets of associated tracks. One of ordinary skill in the relevant art will understand that any suitable number of protuberances 46 and sets of tracks may be used as needed to secure the force-receiving mechanism 16 to the housing 12 in a way that allows the force-receiving mechanism 16 to deploy as needed.

In some embodiments, such as the embodiment illustrated in FIGS. 1-7, the biasing mechanism 14 is inserted within the housing recess 34 prior to inserting the force-receiving mechanism 16. In these embodiments, the biasing mechanism 14 may have a cross-sectional shape that fits within the housing recess 34. In the embodiments where the housing recess 34 is partially enclosed by the base 38, a first end 54 of the biasing mechanism 14 may contact the base 38. In other embodiments where the housing recess 34 forms an aperture 36 through the base 38, the first end 54 of the biasing mechanism 14 may contact the stationary point 24 on the passenger seat assembly 26.

Figure 3:
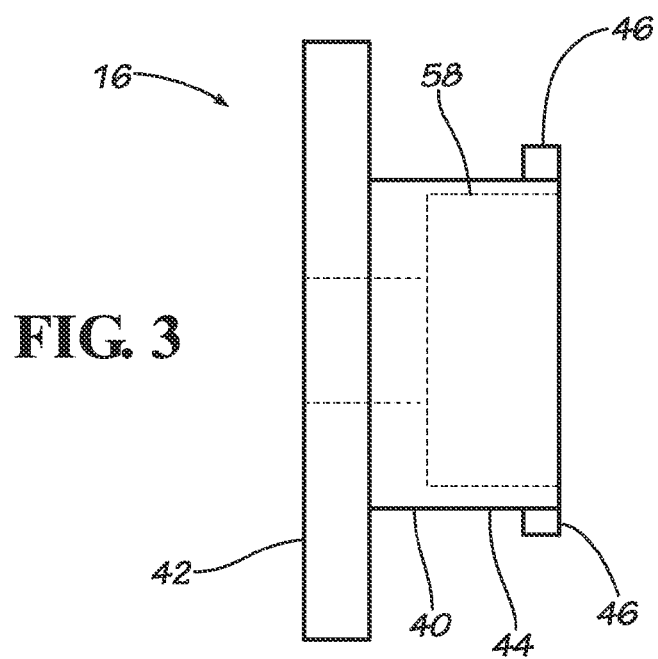
FIG. 3 is a side view of a force-receiving mechanism of the tray table stop assembly of FIG. 1.
Figure 2:
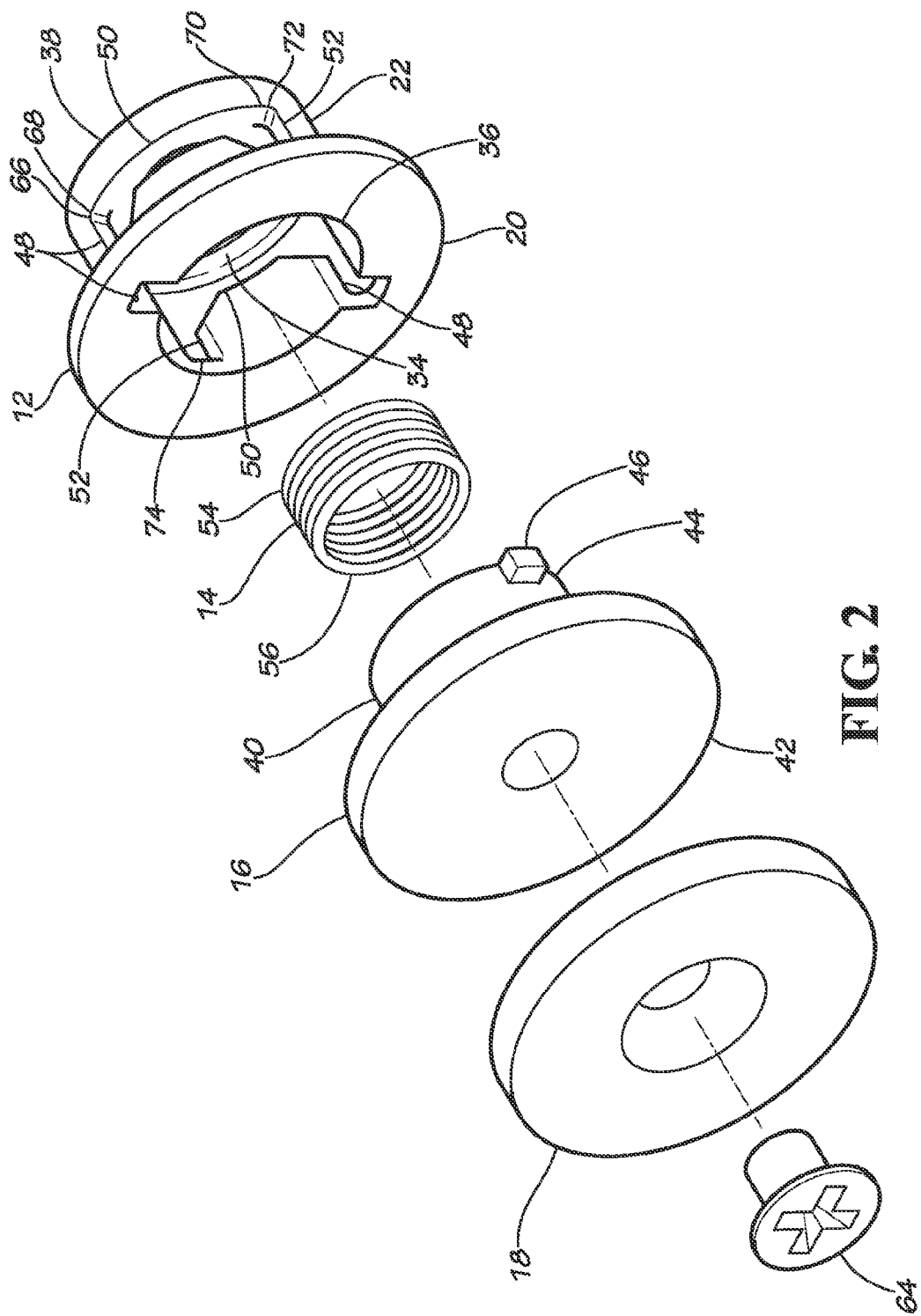
FIG. 2 is an exploded perspective view of the tray table stop assembly of FIG. 1.
Figure 4:
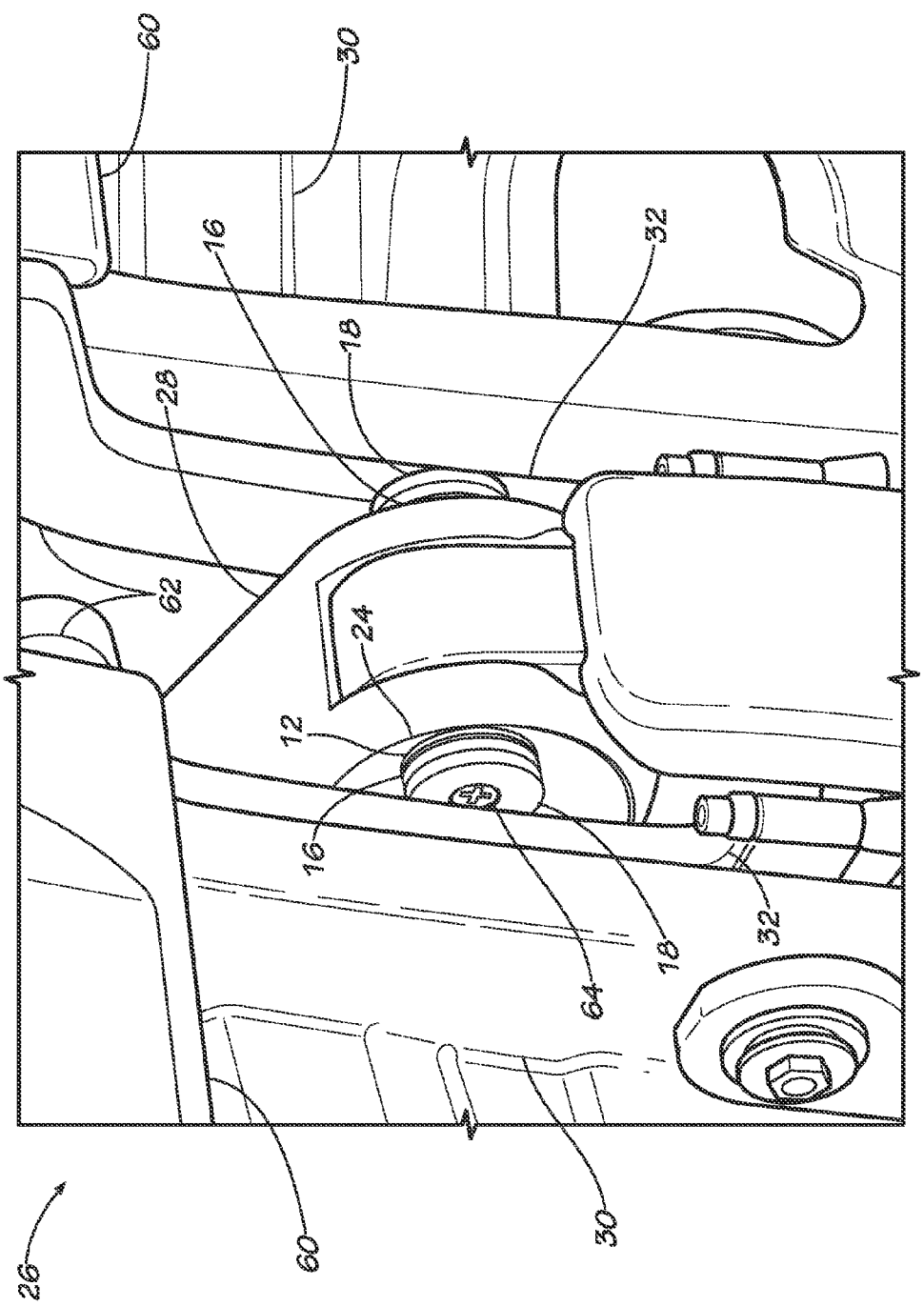
FIG. 4 is a perspective view of two tray table stop assemblies of FIG. 1 in loaded positions with two seat backs in an upright position.
Figure 5:
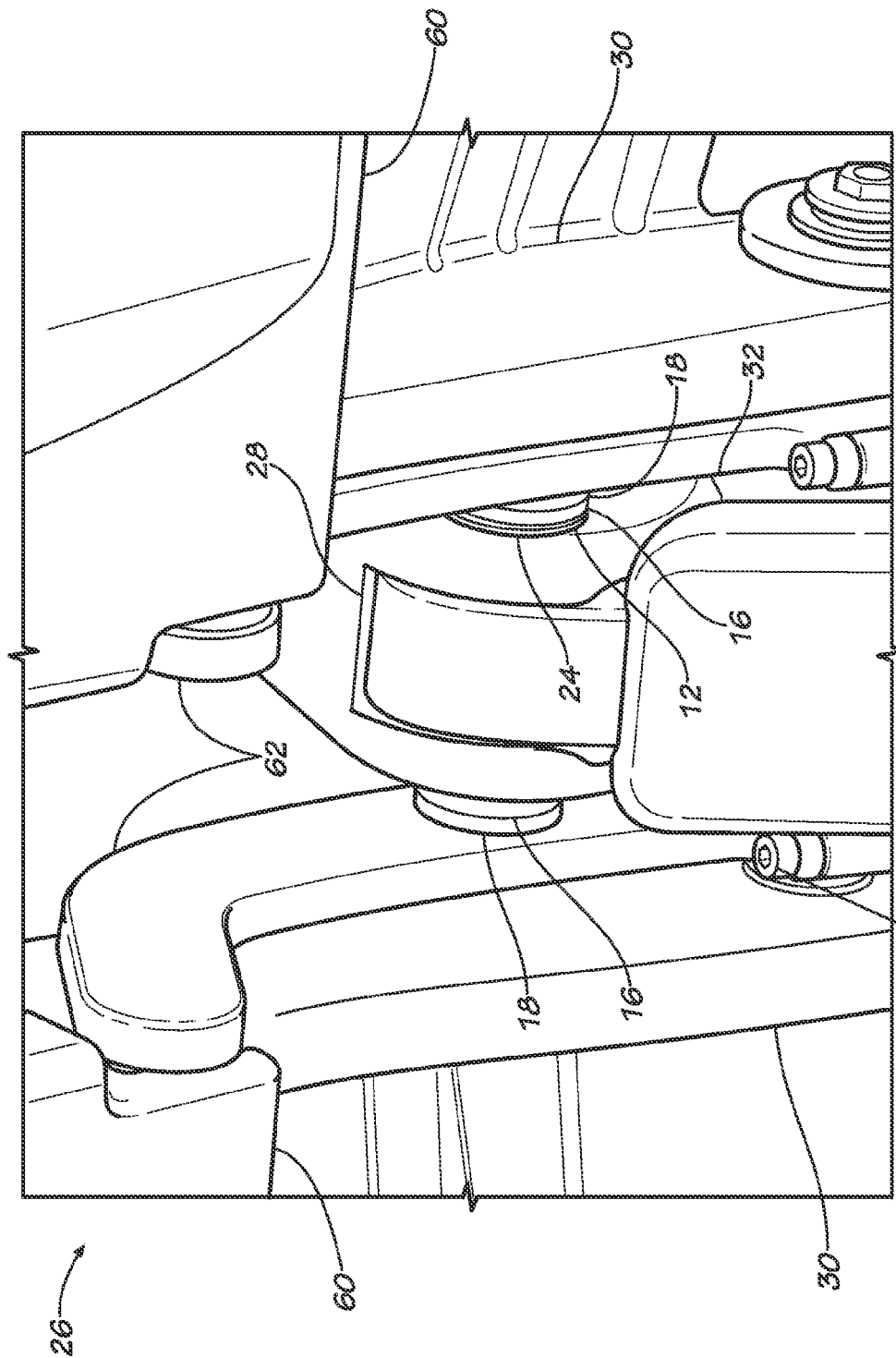
FIG. 5 is a perspective view of two tray table stop assemblies of FIG. 1 in loaded positions and two seat backs in a reclined position.

The biasing mechanism 14 may also have an uncompressed length that exceeds the length of the housing recess 34, so that a second end 56 of the biasing mechanism 14 extends past the outer surface of the housing face plate 20. In these embodiments, as illustrated in FIG. 3, the force-receiving mechanism 16 comprises a force-receiving mechanism face plate 42 coupled to a force-receiving mechanism body 40.

In some embodiments, the force-receiving mechanism body 40 includes a biasing mechanism receptacle 58, which forms a recess within the force-receiving mechanism body 40. The biasing mechanism receptacle 58 is partially enclosed at one end by the force-receiving mechanism face plate 42. The biasing mechanism receptacle 58 is shaped to receive a portion of the biasing mechanism 14. The biasing mechanism receptacle 58 may have any suitable shape that allows the cross-sectional shape of the biasing mechanism 14 to at least partially extend into the biasing mechanism receptacle 58 so that the second end 56 of the biasing mechanism 14 contacts the force-receiving mechanism 16 within the biasing mechanism receptacle 58. As a result, when the force-receiving mechanism 16 is inserted into the housing recess 34, the biasing mechanism 14 is compressed between the force-receiving mechanism 16 and the base 38 (or the stationary point 24 in the embodiments where base 38 includes the aperture 36).

In other embodiments, the force-receiving mechanism body 40 does not include a biasing mechanism receptacle 58 so that the lower end 44 of the force-receiving mechanism body 40 contacts the biasing mechanism 14, and the biasing mechanism 14 does not extend inside the force-receiving mechanism 16. In these embodiments, the uncompressed length of the biasing mechanism 14 may not exceed the length of the housing recess 34 as the biasing mechanism 14 has less space to expand and compress between the force-receiving mechanism 16 and the base 38 (or the stationary point 24 in the embodiments where base 38 includes the aperture 36).

The force-receiving mechanism face plate 42 is configured to maintain contact between the force-receiving mechanism 16 and the tray table assembly 32 during normal stowage and deployment of the tray table assembly 32. In particular, the tray table assembly 32 comprises a table body 60 and a pair of arms 62. The geometry and surface area of the force-receiving mechanism face plate 42 is selected so that the force-receiving mechanism face plate 42 stays in contact with each arm 62 the over the whole range of normal movement of each arm 62. As a result, depending on the width of the arm 62 and the length of travel of each arm 62 between the stowed and deployed positions of the tray table assembly 32, the force-receiving mechanism face plate 42 may have any suitable shape including but not limited to a circle, oval, rectangle or other similar shape. In other embodiments, the force-receiving mechanism face plate 42 may be configured to maintain contact with other types of radial pieces during normal operation of those pieces.

In some embodiments, such as the embodiment illustrated in FIGS. 1-7, the tray table stop assembly 10 may further comprise the cover 18. In these embodiments, such as the embodiment illustrated in FIGS. 1-2, the cover 18 is attached to the force-receiving mechanism face plate 42. In some embodiments, such as the embodiment illustrated in FIGS. 1-7, the shape and size of the cover 18 may be the same as the force-receiving mechanism face plate 42. Typically, the cover 18 may be formed of materials that do not degrade or deform the arms 62, as the arms 62 are positioned to continuously maintain pressurized contact with the cover 18 during normal operation. However, one of ordinary skill in the relevant art will understand that the cover 18 and/or the force-receiving mechanism face plate 42 (in the embodiments where no cover 18 is used) may be made of any suitable material including but not limited to aluminum, stainless steel, other metallic materials, composite materials, flexible plastics, nylon, textiles, or other similar materials.

In these embodiments, the cover 18 may be attached to the force-receiving mechanism face plate 42 by a variety of methods, including not limited to adhesive, a screwing means, a fastening means, or other attachment means. In the embodiment illustrated in FIGS. 1-2, for example, the cover 18 is secured to the force-receiving mechanism 16 by a screw 64. The cover 18 may be attached to the force-receiving mechanism 16 for a variety of reasons throughout embodiments, such as including, but not limited to, to extend the length/reach of the tray table stop assembly 10, to prevent wear or damage upon either the force-receiving mechanism 16 or the tray table arm 62, or to limit the friction between the tray table arm 62 and tray table stop assembly 10 during normal operation of the tray table arm 62.

In the embodiment illustrated in FIGS. 4-7, for example, the tray table stop assembly 10 is manually compressed when the tray table arm 62 contacts the cover 18 and applies a compressive force to the cover 18, which translates the force to the force-receiving mechanism 16, which causes the biasing mechanism 14 to compress and the force-receiving mechanism 16 is positioned in the loaded position. During normal operation, the force-receiving mechanism 16 will remain in the loaded position through application of a force by the arm 62.

Figure 6:
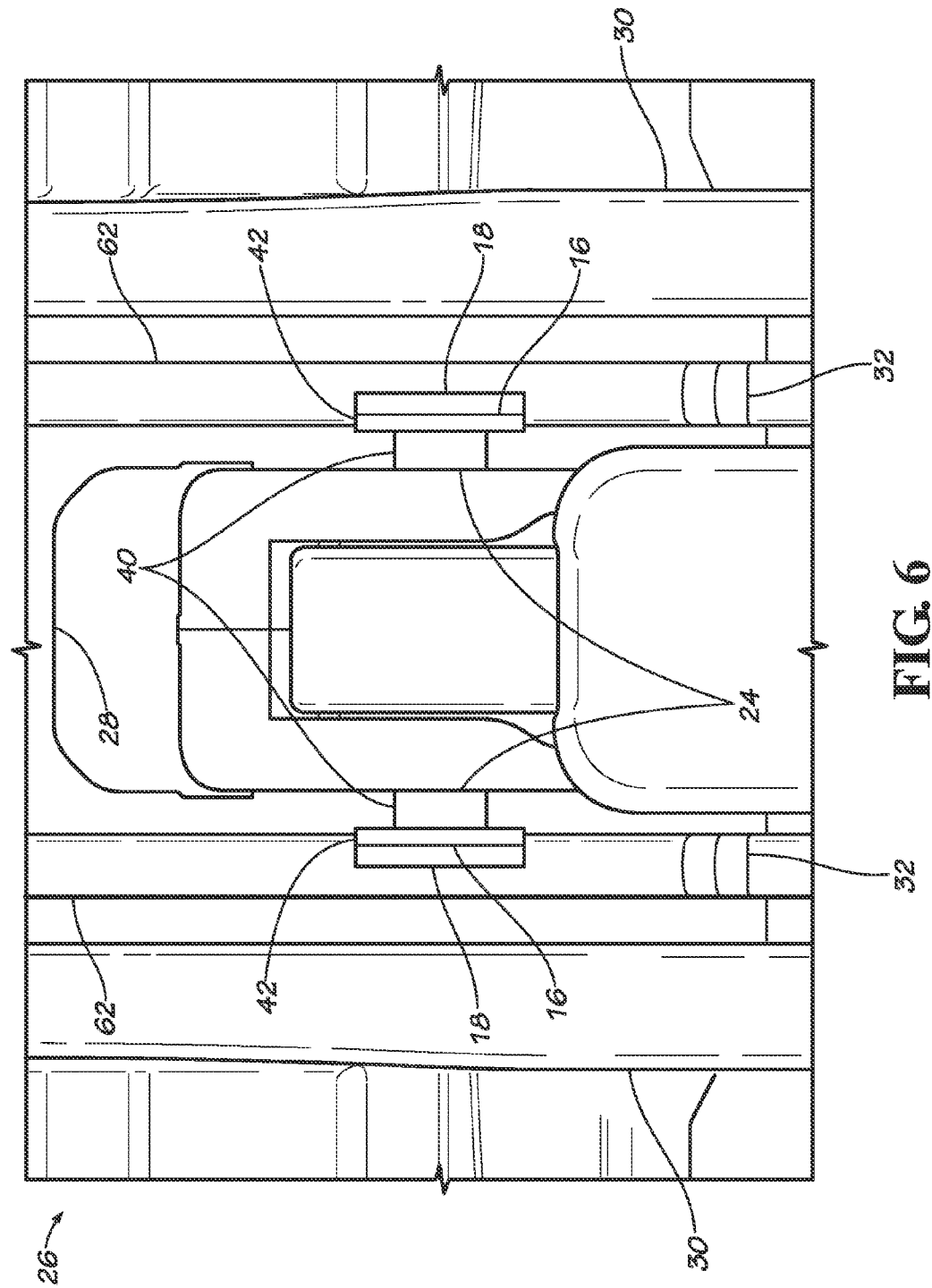
FIG. 6 is a rear view of two tray table stop assemblies of FIG. 1 in deployed positions.
Figure 7:
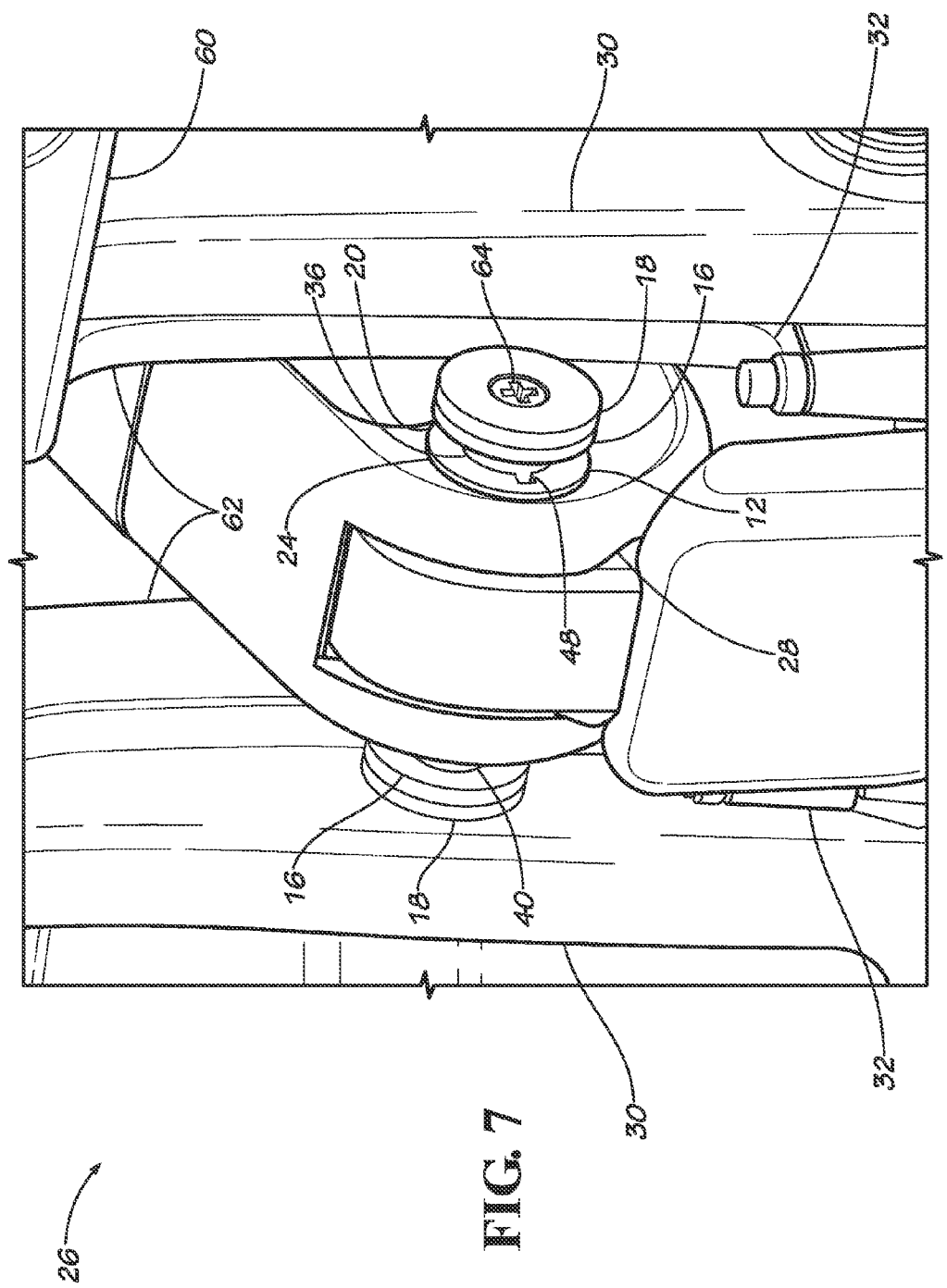
FIG. 7 is a perspective view of two tray table stop assemblies of FIG. 1 in deployed positions.

However, as illustrated by the embodiment illustrated in FIGS. 6-7, if the seat back 30 of the passenger seat assembly 26 becomes displaced forward beyond its intended range of motion, as such in a crash perhaps, the arm 62 of the tray table assembly 32 also moves forward beyond the normal range of motion. As a result, the arm 62 is no longer able to maintain contact with the cover 18 (or force-receiving mechanism 16 in embodiments without a cover 18). Thus, the external force is removed from the force-receiving mechanism 16, which then allows the biasing mechanism 14 to expand from its compressed state and force the force-receiving mechanism 16 into its retracted position. In the retracted position, the table stop mechanism 10 is now positioned in the travel path of the arms 62, which prevents the arms 62 from rotating away from the stowed position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A tray table stop assembly comprising:
   (a) a housing comprising at least one deployment track;
   (b) a force-receiving mechanism comprising at least one protuberance, wherein the at least one protuberance is slidingly coupled to the at least one deployment track of the housing; and
   (c) a biasing mechanism positioned between the force-receiving mechanism and the housing;
   wherein the housing further comprises at least one loading track that is configured to receive the at least one protuberance when the force-receiving mechanism is inserted within the housing.

2. The tray table stop assembly of claim 1, wherein the force-receiving mechanism further comprises a biasing mechanism receptacle that is configured to receive a portion of the biasing mechanism.

3. The tray table stop assembly of claim 1, wherein the housing further comprises at least one rotation track that is coupled to the at least one deployment track and the at least one loading track, wherein the at least one deployment track is configured to receive the at least one protuberance when the force-receiving mechanism is inserted within the housing and rotated.

4. The tray table stop assembly of claim 1, wherein the at least one deployment track does not extend along an entire length of the housing.

5. The tray table stop assembly of claim 1, wherein the housing is formed of a deformable material.

6. A tray table stop assembly comprising:
   (a) a housing comprising at least one deployment track;
   (b) a force-receiving mechanism comprising at least one protuberance, wherein the at least one protuberance is slidingly coupled to the at least one deployment track of the housing;
   (c) a biasing mechanism positioned between the force-receiving mechanism and the housing; and
   (d) a cover attached to the force-receiving mechanism.

7. The tray table stop assembly of claim 6, wherein the cover is formed of plastic.

8. The tray table stop assembly of claim 1, wherein the tray table stop assembly is coupled to a passenger seat assembly adjacent a tray table assembly.

9. A tray table stop assembly comprising:
   (a) a housing comprising at least one deployment track;
   (b) a force-receiving mechanism comprising at least one protuberance, wherein the at least one protuberance is slidingly coupled to the at least one deployment track of the housing; and
   (c) a biasing mechanism positioned between the force-receiving mechanism and the housing;
   wherein the tray table stop assembly is coupled to a passenger seat assembly adjacent a tray table assembly, and an arm of the tray table assembly is positioned to apply pressure to the force-receiving mechanism when the tray table assembly travels between a stowed position and a deployed position.

10. The tray table stop assembly of claim 9, wherein the force-receiving mechanism is positioned within a travel path of the arm when the tray table assembly moves forward beyond the stowed position.

11. A passenger seat assembly comprising:
(a) a tray table assembly comprising at least one arm;
(b) at least one tray table stop assembly comprising:
  (i) a housing comprising at least one deployment track;
  (ii) a force-receiving mechanism comprising at least one protuberance, wherein the at least one protuberance is slidingly coupled to the at least one deployment track of the housing; and
  (iii) a biasing mechanism positioned between the force-receiving mechanism and the housing,
  wherein the at least one arm of the tray table assembly is positioned to apply pressure to the force-receiving mechanism of the at least one tray table stop assembly when the tray table assembly travels between a stowed position and a deployed position.

12. The passenger seat assembly of claim 11, wherein the force-receiving mechanism is positioned within a travel path of the at least one arm when the tray table assembly moves forward beyond the stowed position.

13. A method of assembling a tray table stop assembly, wherein the tray table stop assembly comprises (i) a housing comprising at least one deployment track, (ii) a force-receiving mechanism comprising at least one protuberance, and (iii) a biasing mechanism positioned between the force-receiving mechanism and the housing, the steps comprising:
  (a) inserting the at least one protuberance into at least one loading track, wherein the at least one loading track is positioned within the housing; and
  (b) coupling the at least one protuberance to the at least one deployment track.

14. The method of claim 13, further comprising the step of rotating the force-receiving mechanism within the housing.

15. The method of claim 14, wherein the housing further comprises at least one rotation track that is coupled to the at least one loading track and the at least one deployment track, so that the at least one protuberance travels along the at least one rotation track when the force-receiving mechanism is rotated.

* * * * *